J. BECKER.
FOCUSING CAMERA.
APPLICATION FILED JULY 8, 1901. RENEWED JAN. 12, 1916.
1,195,947.
Patented Aug. 22, 1916.
2 SHEETS—SHEET 1.
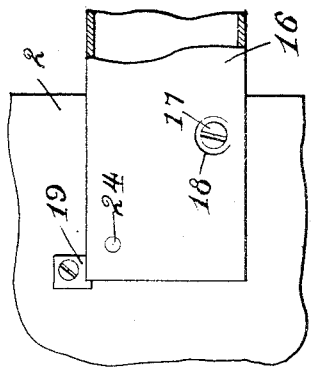
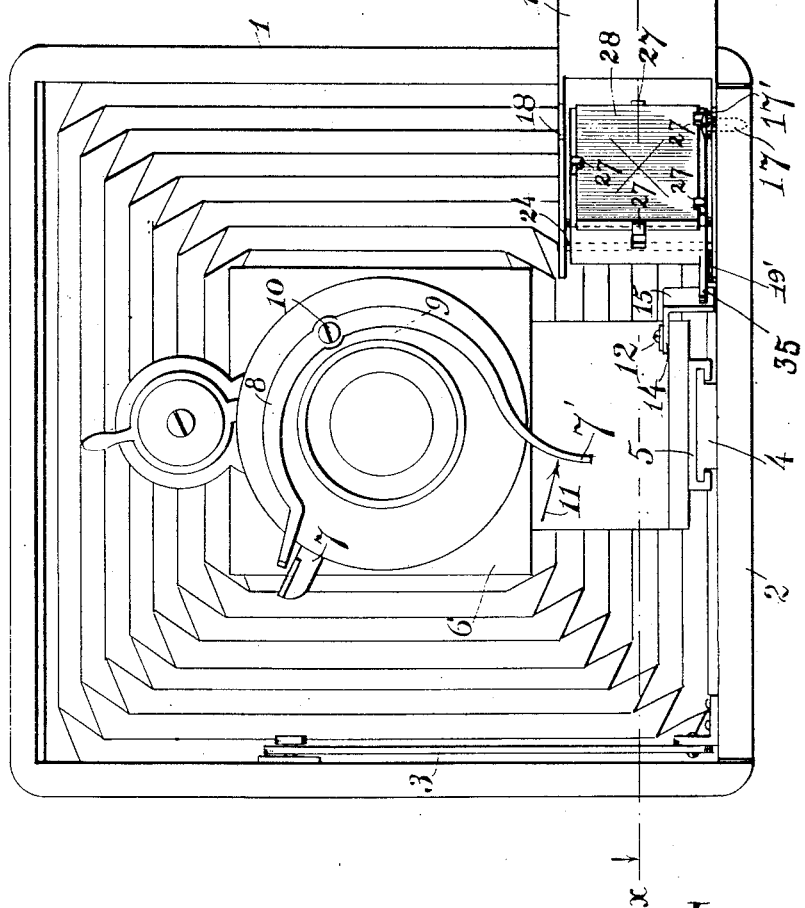
Inventor
Joseph Becker J. BECKER.
FOCUSING CAMERA.
APPLICATION FILED JULY 8, 1901. RENEWED JAN. 12, 1916.
Patented Aug. 22, 1916.
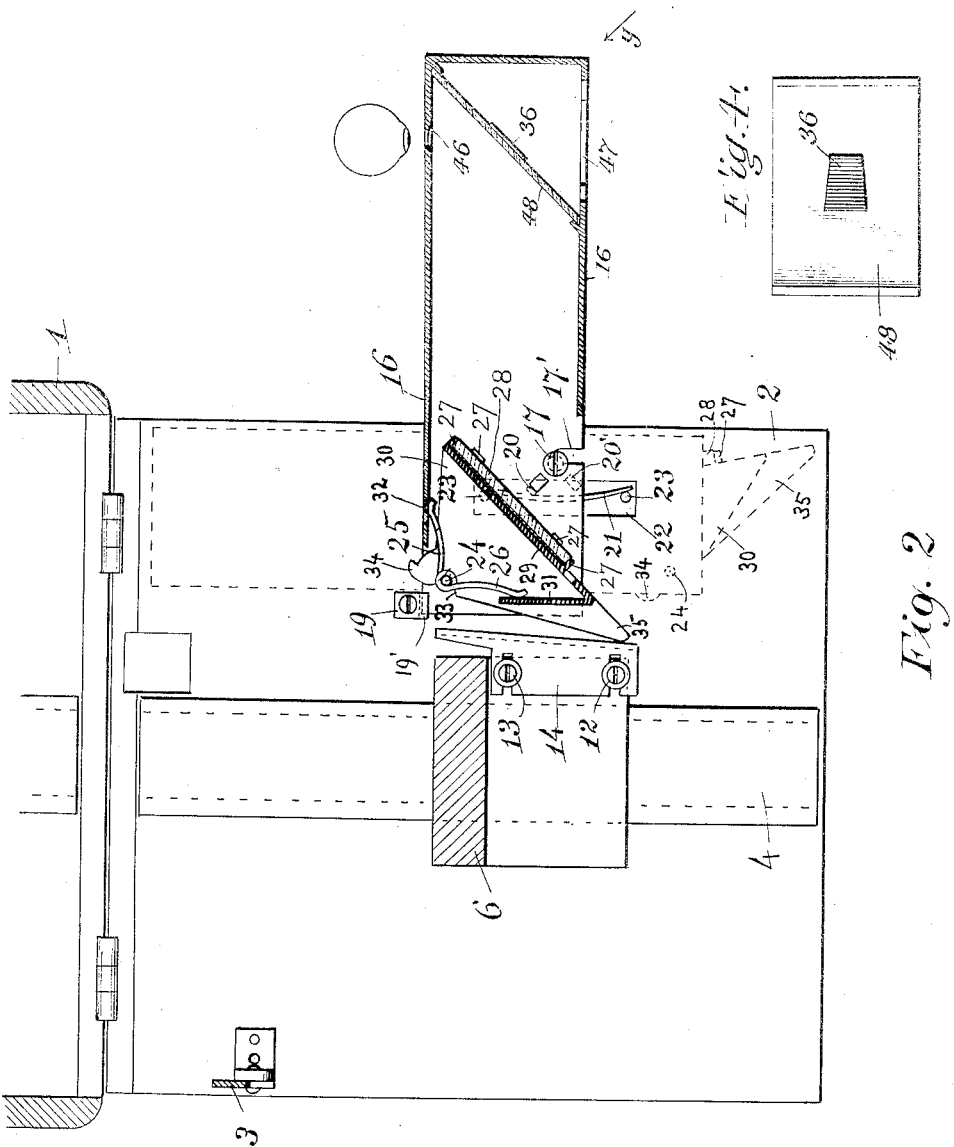

UNITED STATES PATENT OFFICE.

JOSEPH BECKER, OF WASHINGTON, DISTRICT OF COLUMBIA.

FOCUSING-CAMERA.

1,195,947.      Specification of Letters Patent.      Patented Aug. 22, 1916.

Application filed July 8, 1901, Serial No. 67,469. Renewed January 12, 1916. Serial No. 71,809.

*To all whom it may concern:*

Be it known that I, JOSEPH BECKER, a citizen of the United States, residing at Washington, District of Columbia, have invented certain new and useful Improvements in Focusing-Cameras.

The present patent application is identified, for convenience of reference, as Case F.

The present specification hereinafter makes specific references to my related applications or patents as follows: Case A, now Patent 1,178,474, issued April 4, 1916; Case B, now Patent 1,178,475, issued April 4, 1916; Case C, now Patent 1,178,476, issued April 4, 1916.

My present invention consists in a highly improved "optical focuser" of the projecting type shown in my said Case B, but provided with means for storing the focuser in an available recess of the folded up camera, as in my said Case C.

The invention is herein shown as applied to a focuser that is actuated by a cam as in my said Case C, but having the general arrangement of Figure 31, in my said Case A, where the cam is fixed with relation to the lens frame of the camera instead of being fixed with relation to the plate or film frame as it is in my Case C.

The invention further involves, and consists in, other features which are particularly specified and claimed hereinafter.

In the accompanying drawings: Fig. 1 is an elevation of a camera provided with any improved protruding focuser; Fig. 2 is a horizontal section thereof on line $x$—$x$, Fig. 1. Fig. 3 is a plan of parts at and surrounding the hinged connection between the focuser frame and the camera bed; Fig. 4 is a detail view of the eye mirror and its transparent support as seen looking in the direction of the arrow $y$ Fig. 2; and Fig. 5 is a fractional view, similar to the general view, Fig. 2, but showing a modified form of the eye mirror and its transparent support.

The camera comprises a box 1 with hinged cover 2 adapted to be firmly held in its open position by a bracket 3. The cover 2 which, when open, forms the bed of the camera, has a slide way or rail 4, upon which is adapted to glide a carriage 5. On carriage 5 are fixed the lens frame 6 and the lens which is provided with an instantaneous shutter to be released by pressure on finger 7. So far all parts are of the usual construction. Box 1, therefore, is adapted at its back to support the sensitized plate or film either directly by any suitable means or else indirectly by means of removable plate or film holders. In the form shown for illustration the camera is supposed to have a so-called "reversible back" which permits of setting the plate or film with either its longer or shorter dimension parallel to the base board 2.

As my invention permits of focusing without a ground glass, and while the plate or film is already in place for exposure, there need be no loss of time between focusing and exposing; and, in order to utilize this great advantage to the fullest extent without a pneumatic or other elaborate shutter release, I construct the shutter so its release finger shall be close to the means used for focusing and so said finger may be operated by the index finger while the thumb and other fingers of the same hand are used for focusing and steadying the camera. In the present form of my invention I have preferred to not change the shutter mechanism, but to retain the usual finger 7 and to use a second conveniently located trip finger 7' on the end of a bell crank 8, 9 pivoted at 10. Arm 8 is bent back to extend over finger 7 so as to depress the same when pressure is applied on finger 7' in the direction of arrow 11.

In using the device the lens carrier 6 is held between the thumb and the middle finger of the right hand, the index finger is allowed to just rest upon the trip finger 7', and the palm and other fingers bear upon and grip the bed 2. The right hand alone is thus enabled to have the three different useful functions of: first, changing the depth of camera; secondly, steadying the camera; thirdly, releasing the shutter.

The most delicate adjustment of the camera depth may be obtained without any rack and pinion or other gear for reducing motion, because with my focuser the operator judges of the displacements by their effects on the relative positions of the two finder images, and his visual impression greatly enhances the delicacy of his touch. Moreover, as the exposure is made the moment the camera is in focus, the parts are not required to retain their set when abandoned, and, therefore, the plain slide can be made as smooth and easy in action as desirable.

On carriage 5 is adjustably clamped by means of screws 12, 13, an L-shaped piece 14, 15, the vertical face 15 of which is to serve as a cam plate for controlling the set of the movable parts in the focusing attachment. The frame of the latter consists of a box-shaped metallic shell 16 which is pivoted to the hinged bed 2 of the camera by a screw 17 driven home by passing a screw driver through a hole 18 (Fig. 3) in the upper side of the box frame. This frame may be held projecting laterally as shown in full lines or else folded in, as shown dotted in Fig. 2, and these two extreme positions are assured in one direction positively by a stop block 19, Fig. 2, fixed to bed 2; and in the opposite direction by spring action so the frame shall be held firmly pressed against stop 19, both when projecting or when folded in. To this end the frame 16, Fig. 2, has a downwardly projecting lug 20, preferably formed by punching out a part of its lower side; and bed 2 of the camera is provided with a recess 22 in which is set a leaf spring 21, bearing against lugs 23, and which in tending to straighten presses against lug 20. This pressure, when frame 16 is in the projecting position, tends to turn it in clockwise direction and keeps it well pressed against stop 19; but, when frame 16 is folded in to the dotted position lug 20 is moved to 20' and the pressure of spring 21, being now exerted on the opposite side of screw pivot 17, tends to turn frame 16 in the opposite or counterclockwise direction and again keeps it well pressed against stop 19. This spring must be very stiff so frame 16 shall be firmly held in the projecting position against all vibration and also (as will appear clearly later on) against the disturbing tendency of a second spring. As spring 21 is never entirely uncovered by frame 16, no special means need be provided to keep it in place.

I have described frame 16 as being permanently pivoted to bed 2, because this is my preferred construction, but if it is to be detachable I provide a slot 17', leading into the pivot hole of screw 17, and which permits of entirely unmounting frame 16, by slightly compressing spring 21, and giving the frame a lateral motion, which can be done by holding it in a midway position where its motion is not interfered with by stop 19. This stop should have a hook 19', to catch over the lower side of frame 16, and prevent screw 17 from being overstrained.

Within frame 16 are mounted the different optical elements of the focus and field finder. The pivoted mirror 28 is mounted on a spindle 24 which is firmly fixed at its ends in the upper and lower sides of frame 16. Upon this spindle is wound a spring 25, 26, arm 25 of which bears against the inner side of the rear wall of frame 16, in a recess 32, to prevent longitudinal displacements of the spring on the spindle. Arm 26 is intended to bear upon and turn in clockwise direction the pivoted mounting of mirror 28. This mounting upon which the mirror is held and clamped by bent up fingers and claws 27, is wholly formed of one piece of stamped and bent sheet metal and may be considered as comprising a rectangular base piece 29, and triangular sides 30, the latter being braced by an intermediate rectangular piece 31.

The two triangular sides have V bearings 33, to rest on spindle 24, and rearwardly projecting lugs 34, the use of which will be explained below; and the lower one of the two sides has an extension arm 35, adapted to be acted on by cam face 15, and to be held pressed against said face by pressure of arm 26, on base 31. The pivoted mounting can be easily removed and as easily replaced and, when the lens carrier 6 is pushed back into the camera case, the mounting turns until stopped by the abutment of lugs 34 against the rear wall of frame 16. When frame 16 is turned into the folded in position arm 35, will be, as shown dotted in Fig. 2, well within the outline of base 2.

At its outer end the rear wall of chamber 16 is provided with a peep opening 46, and directly opposite this peep the front wall is provided with a window 47 of the form usual in camera-finders which are adapted for use on cameras having a reversible back. These two openings 46 and 47 coöperate in directing and limiting (for the eye shown behind the peep 46) a field of view that is identical with the camera field. Diagonally in the end of frame 16 is rigidly mounted a plain piece of glass 48, and the central part of this plate is silvered as indicated at 36. In order that this silvered portion shall appear rectangular as I prefer to have it, it must be shaped as in Fig. 4, which shows it as viewed in the direction of arrow y, in Fig. 2.

The correct operation of the device depends upon the proper adjustment of cam 15, which will now be described. The camera is mounted on a firm base or tripod and first focused by the usual method on a very distant object. This brings clamp screw 12 of the cam opposite, or very nearly opposite, the contacting end of arm 35, as seen in Fig. 2. The operator, then looking in the finder, will, if the device be out of adjustment, see the distant object broken. He then loosens screw 12 and, while looking in the finder, he mends the broken image of the distant object by turning cam 15 about clamp screw 13 as a pivot; and when the image has thus been mended he tightens clamp screw 12. He then loosens clamp screw 13 to prepare for the second operation.

He focuses by the usual method on a close object; then, looking in the finder, he mends the broken image of the close object (if such image appear broken) by turning cam 15 about screw 12 as a pivot and then he tightens screw 13. It will be noted that the first adjustment for the distant object is not appreciably disturbed by the adjustment for the close object because the latter adjustment has little or no tendency to change the distance between screw 12 and the part of the cam which is directly opposite such screw and which, as stated above, is the point corresponding to the set for infinity. Should any appreciable disturbance of this first adjustment, however, have been produced, the adjustment for both positions is repeated, and the correcting displacements then required will be too small to be capable of producing any further appreciable disturbance.

If the lens used have a chemical focus that differs from the optical focus, the camera should be set for the chemical focus throughout all adjustments, as explained page 20, lines 12 to 27, of my said Case A.

In using the camera the operator supports it on his right shoulder and steadies it by holding the base board 2 with his left hand and the lens support 5, 6 with his right hand. The right hand then also serves to slide the lens in and out on the rail 4 and the index finger of the same hand is held close by the tail 7' of the lever 8, 9 in readiness to release the shutter. The operator's right eye then naturally falls into proper sighting position and he aims the camera very much in the same manner as a hunter aims his rifle. If the operator finds it more convenient to use his left eye or both eyes, he uses the camera on its side with the focus and field finder projecting upwardly.

The inclined transparent support 48, Fig. 2, has the occasional disadvantage of showing false reflections which are wholly avoided by the arrangement shown in Fig. 5 where the finder frame 16', peep 46', and window 47' are all substantially the same as their corresponding parts 16, 46 and 47 in Fig. 2. Fig. 5, however, has a mirror support 48' that is exactly normal to the sighting direction and that is held so by upright members 16'', 16''' fixed to the walls of casing 16'. On this transparent support 48' is cemented the wedge-shaped block 36'', and to this block 36'' is cemented the mirror 36'. Mirror 36' has its upper edge 50 ground at an angle such that the plane of the edge, produced, passes through the peep hole 46'.

What I claim as my invention is:

1. The combination with a camera, of auxiliary focusing means comprising elements for receiving distinct groups of rays from an object to be photographed, and a base upon which said elements are suitably mounted, said base being adapted to be held on the camera either in operative relation for use or in a different relation for storage.

2. The combination with a camera, of auxiliary focusing means comprising elements for receiving distinct groups of rays from an object to be photographed, and a base upon which said elements are suitably mounted, said base being adapted to be held on the camera in protruding relation for use or in non-protruding relation for storage.

3. The combination with a camera comprising a plate supporting frame and a relatively movable lens supporting frame, and a focuser also comprising relatively movable parts; of means for clamping one of said focuser parts to one of the said frames and mechanism for connecting the other focuser part with the other of said frames said mechanism being adapted to be established automatically as the parts are extended into a position of use, and conversely to be automatically disconnected when the said parts are folded for storage.

4. The combination with a camera comprising a plate or film supporting frame, and a relatively movable lens supporting frame, and a focuser also comprising relatively movable parts; of means for clamping one of said focuser parts in fixed relation to the plate or film supporting frame of the camera, the other focuser part being adapted to automatically engage with the lens supporting frame, when the said camera frames are separated for use.

5. The combination with a camera comprising a base adapted to carry a plate or film holding frame, and a lens holding frame which is adapted to be moved on said base for changing the depth of the camera; of a focuser comprising also a base and a relatively movable part; means for holding said focuser base on said camera base either in one position for use or in another position for storage; and mechanism for mechanically connecting the said relatively movable element of the focuser with the movable lens holding frame of the camera, said mechanical connection being adapted to be automatically established as the different parts are opened up into operative relation and conversely:—automatically disconnected when the said parts are folded for storage.

6. The combination with a camera comprising a base carrying a plate or film holding part and a lens holding frame which is adapted to be moved on said base for changing the depth of the camera; of a focuser comprising also a base and a movable part, said focuser base being pivotally mounted on the camera base; a spring for holding the focuser base in either one of two angular positions; and mechanism for mechanically connecting the movable element of the focuser with the movable lens holding frame of the camera, said mechanical connection being adapted to be automatically established as the different parts are opened up into operative relation and conversely, automatically disconnected when said parts are folded for storage.

7. The combination with a camera comprising a base and a movable lens holding frame for focusing, and a focuser comprising also a base and a movable element, said focuser base being pivotally mounted on the camera base, and a spring for holding it in either one of two angular positions, a second spring engaging the movable element of the focuser in one direction and a part on the lens holding frame adapted to contact with the said movable focuser element and force it back against said second spring.

8. The combination with a camera comprising a base and a movable lens holding frame for focusing, and a focuser comprising also a base and a movable element, said focuser base being pivotally mounted on the camera base, and a spring for holding it in either one of two angular positions, a second spring tending to move the movable element of the focuser in one direction and a part on the lens holding frame adapted to contact with the said movable focuser element and force it back against said second spring, and a stop on the focuser base for holding the movable focuser element where it will not interfere with folding.

9. In a focuser for focusing cameras, the combination with a peep and window finder and an inclined mirror located to stop rays of light through the window to the peep, of a second mirror located to one side of the window and adapted to send rays of light to the first mirror.

10. In a focuser for focusing cameras, the combination with a peep and a window finder and an inclined mirror mounted on a transparent support and located to stop rays of light through the window to the peep, of a second mirror located to one side of the window and adapted to send rays of light to the first mirror.

11. In a focuser for focusing cameras, the combination with a peep and window finder, and an inclined plate of glass having a portion of its surface silvered to stop rays of light through the window to the peep; of a second mirror located to one side of the window and adapted to send rays of light to the first mirror.

12. The combination with a camera of auxiliary focusing means comprising elements for receiving distinct groups of rays from an object to be photographed, and connections between the said camera and focusing means, said connections being adapted to be severed by imparting a certain motion to the focusing means with relation to the camera.

13. The combination with a camera having adjustments adapted to vary the distance between its image receiving surface and the nodal point of emergence of the objective, of auxiliary focusing means mechanically connected with the camera for setting the camera in focus on an object in the camera field by utilizing rays of light which do not enter the camera objective, said auxiliary focusing means being adapted to be held on the camera in one relative position to the camera for use, and in another relative position to the camera for storage.

14. The combination with a camera having adjustments adapted to vary the distance between its image receiving surface and the nodal point of emergence of the objective, of auxiliary focusing means mechanically connected with the camera for setting the camera in focus on an object in the camera field by utilizing rays of light which do not enter the camera objective, and means for holding said auxiliary focusing means on the camera either in one relative position to the camera for use or in another relative position to the camera for storage.

15. The combination with a camera having adjustments adapted to vary the distance between its image receiving surface and the nodal point of emergence of the objective, of auxiliary focusing means mechanically connected with the camera for setting the camera in focus on an object in the camera field by utilizing rays of light which do not enter the camera objective, and means for holding said focusing means on the camera either in protruding relation for use or in non-protruding relation for storage.

16. The combination with a lens-supporting frame, a plate or film supporting frame, and an extensible light-tight connection between them; of mirrors mounted in pivotal relation to each other on said plate or film supporting frame, and a cam mounted on said lens-supporting frame to move with said lens-supporting frame for controlling the relative inclination of the said mirrors mounted on the said plate or film supporting frame, so that to each relative position of the said two supporting frames shall correspond a certain relative inclination of the said mirrors.

17. The combination with a lens-supporting frame, a plate or film supporting frame, and an extensible light-tight connection between them; of mirrors mounted in pivotal relation to each other on said plate or film supporting frame, and a cam mounted on said lens-supporting frame for controlling the relative inclination of the said mirrors, so that to each relative position of the said two supporting frames shall correspond a certain relative inclination of the said mirrors, said cam being adjustable so that the said correspondence may be varied.

18. The combination with a lens-supporting frame, a plate or film supporting frame, and an extensible light-tight connection between them; of mirrors mounted in pivotal relation to each other on said plate or film supporting frame, a cam mounted on said lens-supporting frame for controlling the relative inclination of the said mirrors, so that to each relative position of the said two supporting frames shall correspond a certain relative inclination of the said mirrors, said cam being adjustable so that the said correspondence may be varied; and means for limiting and directing the field of vision to make it substantially identical with the camera field.

19. In a focuser for cameras, the combination with a finder comprising a window and means for determining the position of the observer's eye with relation to said window, of an inclined mirror located to stop rays of light through the window to the observer and a second mirror located to one side of the window and adapted to send rays of light to the first mirror.

20. In a focuser for cameras, the combination with a finder comprising a window and means for determining the position of the observer's eye with relation to said window, of an inclined mirror located on a transparent support to stop rays of light through the window to the observer and a second mirror located to one side of the window and adapted to send rays of light to the first mirror.

21. In a focuser for cameras, the combination with a finder comprising a window and means for determining the position of the observer's eye with relation to said window, of an inclined plate of glass having a portion of its surface silvered to stop rays of light through the window to the observer and a second mirror located to one side of the window and adapted to send rays of light to the first mirror.

JOSEPH BECKER.

Witnesses:
 MARY E. COWELL,
 GUY E. PADGETT.